United States Patent
Rotstein

(10) Patent No.: US 9,609,477 B2
(45) Date of Patent: Mar. 28, 2017

(54) DEVICES AND METHODS FOR GEO FENCING

(71) Applicant: Intel Corporation, Santa Clara, CA (US)

(72) Inventor: Ron Rotstein, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 14/575,048

(22) Filed: Dec. 18, 2014

(65) Prior Publication Data

US 2016/0183049 A1 Jun. 23, 2016

(51) Int. Cl.
*H04W 24/00* (2009.01)
*H04W 4/02* (2009.01)
*H04W 64/00* (2009.01)

(52) U.S. Cl.
CPC ........... *H04W 4/021* (2013.01); *H04W 64/00* (2013.01)

(58) Field of Classification Search
CPC ..................................................... H04H 20/59
USPC ........................................... 455/456.1–456.5
See application file for complete search history.

(56) References Cited

U.S. PATENT DOCUMENTS 8,326,315 B2 * 12/2012 Phillips .............. G08B 21/0236
 348/552
9,215,560 B1 * 12/2015 Jernigan ................ H04W 4/021

OTHER PUBLICATIONS

"Amendment 3: Enhancements for Very High Throughput in the 60 GHz Band", IEEE Standard for Information technology—Telecommunications and information exchange between systems Local and metropolitan area networks—Specific requirements Part 11, (Dec. 28, 2012), 628 pgs.
"TGac Channel Model Addendum Document", IEEE P802.11 Wireless LANs doc.: IEEE 802.11-09/0308r1212, (Mar. 2010), 20 pgs.
"Wireless LAN Medium Access Control (MAC) and Physical Layer (PHY) Specifications", IEEE Standard for Information Technology Telecommunications and information exchange between systems Local and metropolitan area networks—Specific requirements Part 11, (Mar. 29, 2012), 2793 pgs.

* cited by examiner

*Primary Examiner* — Joshua Schwartz
(74) *Attorney, Agent, or Firm* — Schwegman Lundberg & Woessner, P.A.

(57) ABSTRACT

Generally discussed herein are systems and apparatuses for determining a location of a device. Also discussed herein are methods of using the systems and apparatuses. According to an example a mobile device may include processing circuitry including a Measurement Engine (ME) and a Position Engine (PE), wherein the PE is configured to provide a location estimate of the device using a location function, generate an estimate location function that approximates the location function to within a specified error, and provide the estimate location function to the ME, and wherein the ME is configured to receive a geo fence boundary defining a boundary of a geographical region, determine a plurality of pseudo ranges between the device and a plurality of navigation satellites, and determine, using the estimate location function and the plurality of pseudo ranges, whether the device is within the geographical region defined by the geo fence boundary.

16 Claims, 7 Drawing Sheets

DEVICES AND METHODS FOR GEO FENCING

TECHNICAL FIELD

Embodiments generally relate to systems, devices, and methods for approximating a location of a device. More specifically, one or more embodiments discussed herein relate to geo fencing. The geo fencing includes generally defining boundaries of geographical regions and informing processing circuitry when those defined regions are entered or exited.

BACKGROUND

Many devices include one or more location clients that operate using the location of the device as an input. Determining (e.g., continuously, often, or with a relatively high frequency) the location of the device using current apparatuses and techniques may consume more power than necessary, thus reducing the battery life of the device. Also, the current techniques and devices are limited in their ability to process location and geo fence events when the device is in a low power, sleep, or other mode where the power consumption of the device is limited.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed herein.

DESCRIPTION OF EMBODIMENTS

Discussed generally herein are systems, devices, and methods for determining whether a geo fence event has occurred (e.g., an object has moved across a geo fence boundary). An embodiment may be implemented in hardware, software, firmware, or a combination thereof. One or more embodiments may simplify a geo fence event calculation in a location determination system, such as a Global Navigation Satellite System (GNSS). Some embodiments allow the position of a device to be estimated in a Measurement Engine (ME) and some embodiments allow an ME to determine whether a device has crossed a geo fence boundary without determining the position of the device.

Whether the geo fence boundary has been crossed may be verified with assistance from a higher layer service, such as may be implemented in a Position Engine (PE). The operations performed by the ME are generally lower cost in terms of computer resources required to carry out the operations and in terms of power consumption as compared to those of the PE. The operations performed by the PE may be complex mathematically, consume more computer resources, and/or consume more power than the operations performed by the ME. Thus, offloading one or more operations typically performed by the PE to the ME, and reducing the amount of computation performed by the PE, may reduce power consumption of a device, thus allowing for a longer battery life of the device. Systems, apparatuses, and methods discussed herein may provide a lower power cost alternative to a dedicated PE location determination engine while still offering full location client functionality.

Figure 1:
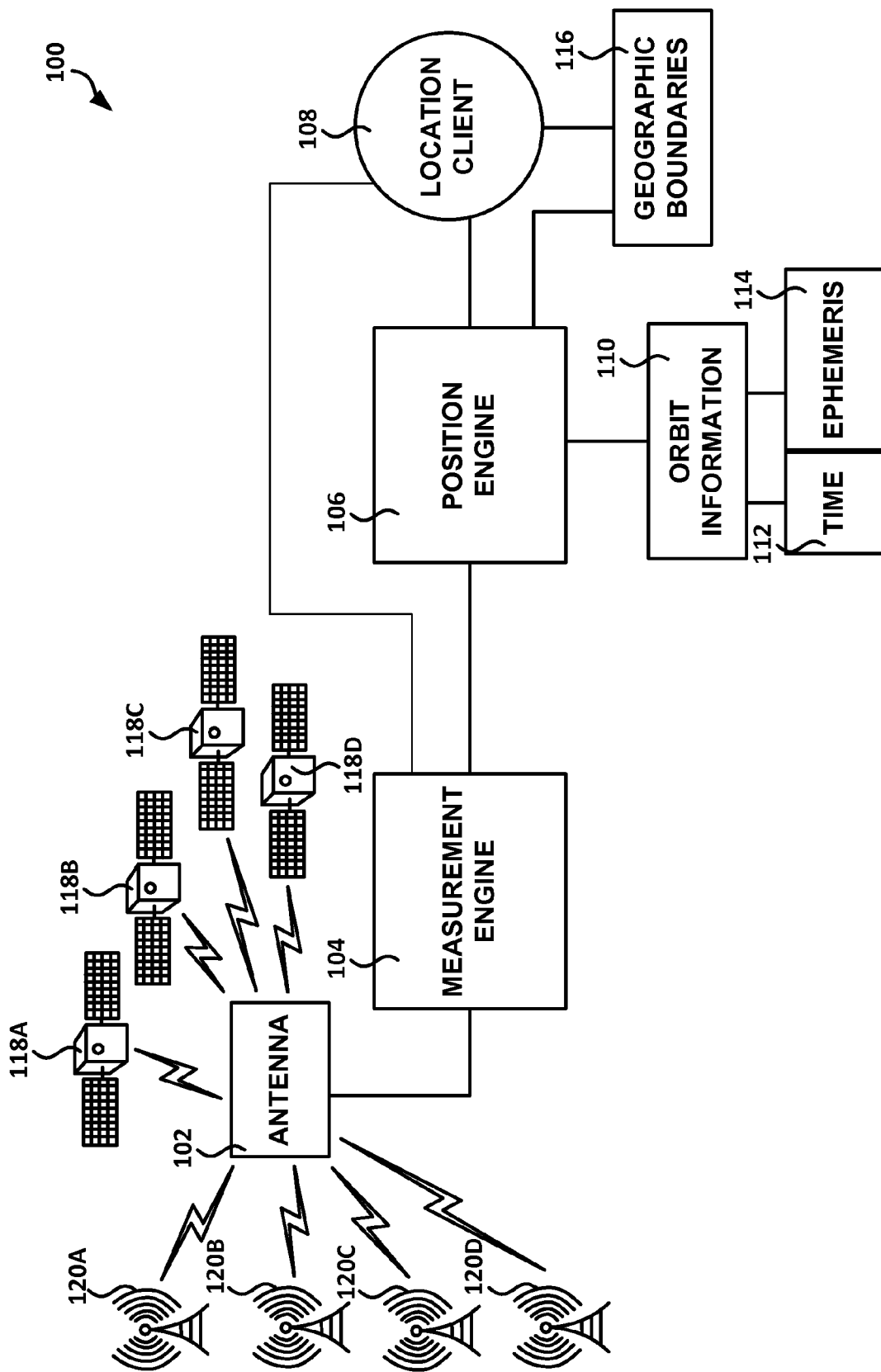
FIG. 1 illustrates, by way of example, a block diagram of an embodiment of a geo fence system.

FIG. 1 illustrates, by way of example, an embodiment of a geo fence system 100. The system 100 includes an antenna 102, an ME 104, a PE 106, and a location client 108. The antenna 102, ME 104, PE 106, and location client 108 may be implemented in a device (device not shown in FIG. 1, see FIG. 2 for an example of a device 210).

The antenna 102 may include any type of antenna suitable for transmitting and/or receiving wireless communication signals, blocks, frames, transmission streams, packets, messages and/or data. The antenna 102 may include a structure and material composition suitable for directional communication (e.g., beam forming) The antenna 102 may include a phased array antenna, a multiple element antenna, a set of switched beam antennas, and/or the like. In some embodiments, the antenna 102 may implement transmit and receive functionalities using separate transmit and receive antenna elements. In some embodiments, the antenna 102 may implement transmit and receive functionalities using common and/or integrated transmit/receive elements. The antenna 102 may receive a signal from one or more satellite(s) 118A, 118B, 118C, and/or 118D (e.g., GNSS satellites) or one or more cellular base station(s) 120A, 120B, 120C, and/or 120D (e.g., enhanced node Bs or the like).

The ME 104 may be implemented in hardware, software, firmware, or a combination thereof. The ME 104 is implemented in the Physical Layer (PHY) of the device. The PHY layer is the first layer of a device as detailed in the Open Systems Interconnection (OSI) model. Generally, the PHY layer translates a request from a data link layer into hardware-specific operations, among other operations, such as functions provided by the ME 104 and the PE 106. The ME 104 may receive the signals from the antenna 102 as an input and estimate a range of distances between the device and the satellite(s) 118A-D or the base station(s) 120A-D. The estimated distances may be used by the ME 104 or the PE 106 to determine potential locations of the device. The estimated distances to the satellite(s) 118A-D or base station(s) 120A-D from the ME 104 may contain a random or maximum amount of error.

These distance estimates from the ME 104 corresponding to at least four satellites 118A-D or base stations 120A-D may be provided to the PE 106. The PE 106 may perform some mathematical operations using the estimated distances (i.e. pseudo ranges) and the satellite orbit information 110. The satellite orbit information 110 may include time 112, and ephemeris 114 information. The ephemeris 114 is an equation that defines a location of a space object as a function of time. The time 112 may be used as an input to the ephemeris 114 to determine the location of a corresponding satellite 118A-D at the time 112.

The position from the PE 106 may be used as an input to a location client 108, such as a geo fencing or navigation application. Since a base station 120A-D is stationary and the location is known, the location calculation of the device is simpler using the base station(s) 120A-D than using the satellite(s) 118A-D. The orbit information 110 (e.g., the time 112 and ephemeris 114) are not needed when performing triangulation using the base station(s) 120A-D.

The location client 108 may include an application, such as may be implemented in software, hardware, firmware, and/or a combination thereof. The location client 108 may use the location of the device (see device 210 of FIG. 2), as determined by the ME 104 or the PE 106 in performing one or more operations of the application. The location client 108 may include an application and/or service, such as may include geo fencing, navigation, a commercial application, a social application, and/or the like. In one or more embodiments, the location client 108 may include an indoor navigation application an outdoor navigation application. The location client 108 may issue a request for a location estimate of the device, such as to the ME 104 and/or the PE 106.

The location client 108 may use a set of geographic boundaries 116 and a location of a device, such as may be determined by the PE 106 or the ME 104, to determine if the device has traveled over and/or within a geographic boundary (as defined by the geographic boundaries 116). The geographic boundaries 116 may be predefined, or defined by a user.

An alert may be issued by the location client 108 in response to determining a device has crossed over a geographic boundary of the geographic boundaries 116. For example, a parent may want to know when their child enters a specific region of town. The parent may specify or select a geographic region associated with one or more geographic boundaries 116, and if the child enters the geographic region with the device, an alert (e.g., a text, phone call, email, or sound) may alert the parent that the geographic boundary has been crossed.

A geo fencing application is generally concerned with determining whether a user crosses a geographic boundary, thus the geo fencing application may require a frequent location fix to determine when and/or whether the device crosses the geographic boundary. Similarly, a tracking or navigation application, such as one that provides directions to a user, may require a frequent location fix to update the location of the device on a map. Running the PE 106 however requires a significant amount of power and computational resources of the device as compared to the ME 104. Thus, if the ME 104 may be used to perform some functions of the PE 106, some power may be saved and computational resources may become free to perform other operations.

Offloading some operations of the PE 106 to the ME 104 may include estimating a location of the device using the ME 104. The location estimate from the ME 104 may include a larger error than a location estimate provided by the PE 106. The estimate provided by the ME 104 may be simpler mathematically, may be faster to perform, may be less resource intensive, and/or may consume less power than the location technique performed by the PE 106. The location estimate performed by the ME 104 may be an estimate of the estimate performed by the PE 106. The estimate of the function implemented by the PE 106 may include a range matrix estimate, Fourier series estimate (e.g., a Fourier Legendre series), a Chebyshev estimate, or a polynomial estimate, among other estimates. The estimate may be determined using Remez's algorithm, among other estimate algorithms. If a location client requires a higher accuracy location estimate than may be provided by the estimate location function implemented by the ME 104, then the PE 106 may continue to perform the location fix for that location client.

A function, F, is approximated by an estimate function, A, to within an error, E as in the following equation $|F-A|<E$. Using a polynomial estimate, to reduce E, generally a higher power variable is added to the estimate function. Using a Chebyshev estimate, E is generally reduced by expanding the series by another term (i.e. if the highest power term approximating the function is N, then expanding the series includes adding a variable (multiplied by a coefficient) that has a power of N+1).

The estimate location function may be determined using a speed, trajectory, and/or direction of the device. The estimate location function may be valid for a specified amount of time. The specified amount of time may be determined by the PE 106. The specified amount of time may be determined using the speed, trajectory, and/or direction of the device and/or ephemeris information. The specified amount of time may be determined by the PE 106 predicting a time the device will cross a geo fence boundary. The specified amount of time may be determined by the PE 106 to help ensure that the error of the estimate location function is bounded to within a specified error.

The PE 106 generally determines a GNSS position fix, P, such that P=F[Time, OrbitInfo, Environmental State] (Pseudo Ranges). This equation hints at the complexity of the location determination technique of the PE 106. The location determination technique of the PE 106 is a nonlinear function which is time dependent and accounts for time dependent parameters, such as the orbital information 110 (e.g., time 112 and ephemeris 114) and the environmental state in the path of a signal between a satellite 118A-D and the device, such as multipath interference, shading, or the like. However, for the purposes of obtaining a location, such as may be used for navigation or geo fencing, an estimate of the PE location function may be generated and used, such as to save power, computational resources, or time in determining a location of the device.

Multipath interference occurs when a signal reflects off of a surface to the receiver, thus confusing the device as to which signal (the reflected or the non reflected signal is the signal to consider. Shading occurs when there is no direct line of sight to the satellite from the device, where an object shades the device from the satellites view. Both multipath and shading may causes error in a position estimate.

The estimate location function generated may be bounded by a specified error. The error of a location estimate using the estimate location function implemented by the ME 104 is generally larger than the error in the location estimate provided by the PE 106. The location estimate may be valid for a certain duration of time, such as to bound the error of the estimate. Since the satellite(s) 118A-D are mobile and the device may be mobile and the location estimate function is generally dependent on the relative position of the device to the satellite(s) 118A-D, location estimate is bounded to within a specified error as long as the relative positions of the device and the satellite(s) 118A-D remain relatively the same.

The estimate, G, of the PE 106 location function, F, may be defined as: G (PseudoRanges, Time)=Approx (F), such that $|F-\text{Approx }(F)|<E$ for a given time interval $[t_1, t_2]$. The PE 106 then sends the estimate location function and/or the time interval ($[t_1, t_2]$) to the ME 104. The PE 106 may then go into a sleep mode. The ME 104 then monitors the location of the device until one or more location (e.g., geo fence)

conditions have been met. The one or more conditions may include the estimate location function implemented by the ME 104 indicating that the device has crossed a geo fence boundary and/or the time interval elapsing. If either condition is met, the PE 106 may be woken up. A command may be issued to the PE 106, such as by the ME 104, to cause the PE 106 to verify whether the geo fence boundary has been crossed and/or to cause the PE 106 to update the estimate location function.

In response to the specified amount of time lapsing and/or in response to the ME 104 determining that the device has crossed a geo fence boundary, the PE 106 may be woken up. In response to being woken up, the PE 106 may determine the devices location using the more accurate location estimation technique implemented by the PE 106. The ME 104, PE 106, or the location client 108 may then determine whether the device has crossed a geo fence boundary since the last PE 106 location fix. The PE 106 may update the estimate location function implemented by the ME 104 and/or determine an amount of time in which the estimate location function is valid. The PE 106 may then return to sleep mode and wait to be woken up again before performing a location fix. In this manner, the ME 104 may perform the operations needed for the application 108 with assistance (e.g., low rate assistance) from the PE 106.

Figure 2:
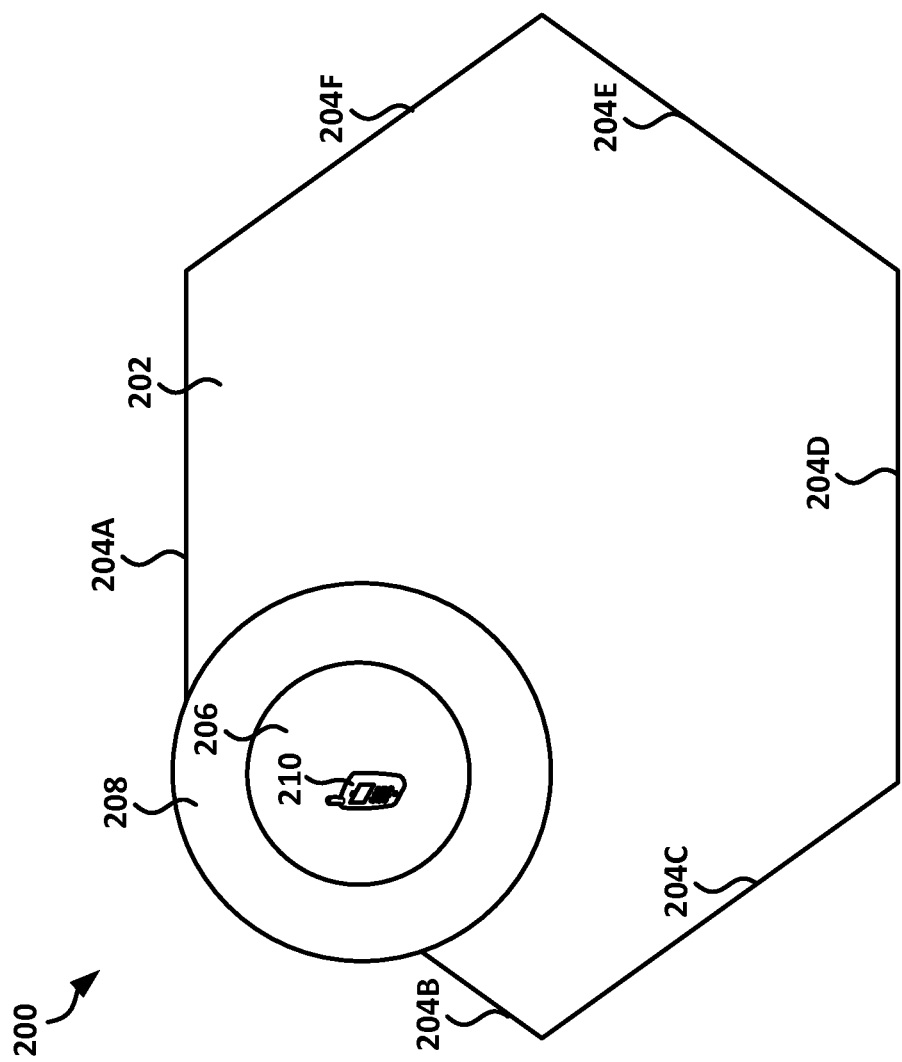
FIG. 2 illustrates, by way of example, a block diagram of an embodiment of a location client map.

FIG. 2 illustrates, by way of example, an embodiment of a location client map 200. The map 200 as illustrated includes a geo fence 202, a location estimate 206 of a device 210 as provided by the PE 106, and a location estimate 208 of the device 210 as provided by the ME 104. The geo fence 202 may include a plurality of boundaries 204A, 204B, 204C, 204D, 204E, and 204F. The boundaries 204A-F may be defined by connecting specified vertices of the geo fence 202 with straight lines. The vertices may be specified by a user selecting the points on a map or providing Global Positioning System (GPS) coordinates of the vertices, among others. The geo fence boundaries 116 may include the vertices and/or the geo fence boundaries 204A-F.

FIG. 2 shows that the geo fence boundaries form a hexagon, however other geographical region shapes may be defined. For example, a user may define a center and a radius that defines a circular geographical region. In another example, two vortices of an ellipse may be provided or selected by the user to define an elliptical geographical region. Other geographical region shapes may be defined, such as other polygonal or irregular shaped geographical regions.

The device 210 may be a mobile device. In some embodiments, the device 210 may be a mobile device, such as a communication station (STA), a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), a device that supports Dynamically Composable Computing (DCC), a video device, an audio device, an A/V device, a gaming device, a media player, a Smartphone, or the like.

The device 210 is capable of communicating content, data, information and/or signals via a wireless medium (WM). In some demonstrative embodiments, WM may include, for example, a radio channel, a cellular channel, a GNSS channel, a Radio Frequency (RF) channel, a Wireless Fidelity (WiFi) channel, an infrared (IR) channel, a Bluetooth (BT) channel, and/or the like.

The device 210 may include at least one radio (radio not depicted in FIG. 2, see FIG. 7) to perform wireless communication between the satellite(s) 118A-D and the ME 104, PE 106, or location client 108. The device 210 includes the ME 104, PE 106, and location client 108. The orbit information 110 and/or the geo fence boundary 116 may be communicated to the device 210 using the radio.

While the PE 106 is determining the location of the device 210, the location estimate 206 is used as the location of the device 210. While the ME 104 is determining the location of the device 210, the location estimate 208 is used as the location of the device 210. The location estimate 208 includes a greater error than the location estimate 206, thus the location estimate 208 includes a larger range of possible locations for the device 210 than the location estimate 206.

The boundaries 204A-F may be defined by a user using the location client 108 or predetermined by the location client 108. The boundaries 204A-F may be defined using longitude and latitude coordinates, a zip code, property boundaries, or the like. The location client 108 may incorporate a mapping program (e.g., Google Earth or other mapping program) that allows a user to draw or select a boundary or provide vertices corresponding to a boundary. The location client 108 may then store the boundary for future reference, such as in the geographical boundaries 116. The location client 108 may allow a user to upload a boundary, such as by providing a Global Positioning system eXchange (GPX) formatted file or a Keyhole Markup Language (KML) formatted file including the GPS data defining the one or more boundaries.

The location client 108, ME 104, and/or PE 106 may receive the location estimate 206 or 208 from the PE 106 or the ME 104, respectively. The location client 108, ME 104, or PE 106 may compare the location estimate 206 or 208 to the boundaries 204A-F to determine whether the device 210 has crossed a boundary 204A-F. The location client 108, ME 104, or PE 106 may determine that the device 210 has crossed the boundary 204A-F if a predefined portion of the location estimate 206 or 208 crosses the boundary 204A-F. For example, the location client 108, ME 104, or PE 106 may determine the device 210 has crossed the boundary 204A-F if one or more points in the location estimate 206 or 208 cross the boundary 204A-F. In one or more embodiments, the location client 108, ME 104, or PE 106 may determine the device 210 has crossed the boundary 204A-F in response to determining the location estimate 206 or 208 is mostly within the geo fence 202 (e.g., fifty percent or more of the points within the location estimate 206 or 208 are within the geo fence 202) or a predetermined amount of the location estimate 206 or 208 is within the geo fence 202 (e.g., one percent, two, percent, five percent, ten percent, one third, more than half, ninety percent, or other amount of the points of the location estimate 206 or 208 are within the geo fence 202). The location client 108, ME 104, or PE 106 may issue an alert in response to determining the device 210 is within the geo fence 202. The alert may include an email, text message, or other alert that may be provided by a device, such as a mobile communications device.

Figure 3:
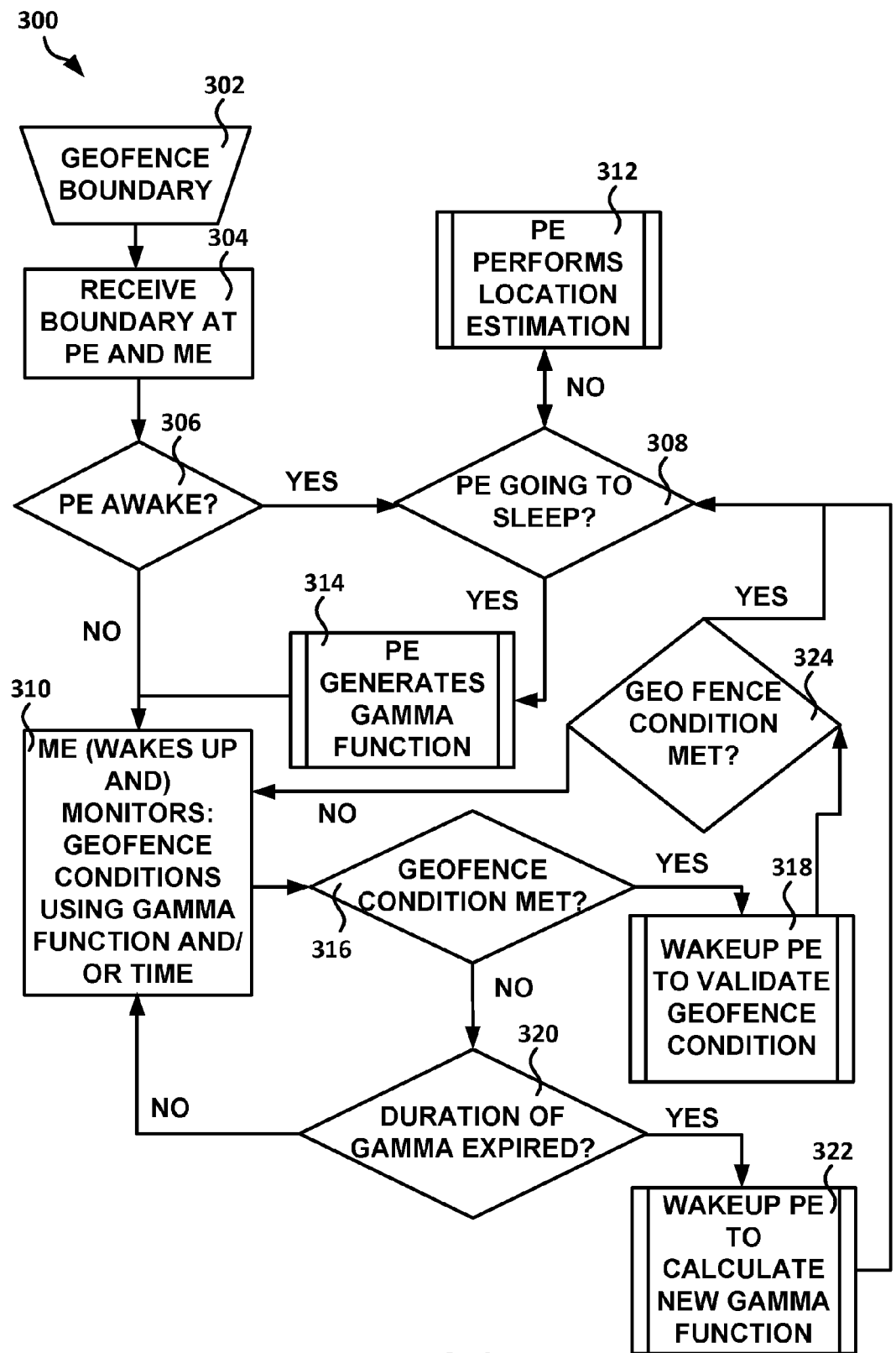
FIG. 3 illustrates, by way of example, a flow diagram of an embodiment of a method of geo fencing.

FIG. 3 illustrates, by way of example, a flow diagram of an embodiment of a method 300 of geo fencing. The method 300 may include defining or receiving a geo fence boundary at operation 302. The geo fence boundary may be received at the PE 106 and the ME 104 at operation 304. At operation 306, it may be determined if the PE 106 is awake (i.e. in an active mode of operation or not in a sleep mode). If the PE 106 is awake, it may be determined at operation 308 if the PE 106 is going to sleep. If the PE 106 is not awake, the ME 104 may be woken up periodically to monitor a geo fence condition (e.g., if a geo fence boundary is being or has been crossed) using an estimate location function, G (i.e. "Gamma"), at operation 310. The ME 104 may monitor whether a time to determine whether the estimate location function is still valid, at operation 310.

At operation 308, it may be determined whether the PE 106 is going to sleep. If the PE 106 is not going to sleep, the PE may perform a location estimation at operation 312. If the PE 106 is going to sleep, the PE 106 may generate an estimate location function (i.e. "Gamma") and send the estimate location function to the ME 104, at operation 314. At operation 316, the ME 104 may determine if a geo fence condition is met. If the geo fence condition is met, the PE 106 may be woken up at operation 318. A command may be issued to the PE 106 to validate that the geo fence condition was/is met, such as at operation 318. The PE 106 may determine whether the geo fence condition was met, and report to the ME 104 whether the condition was or was not met. If the geo fence condition was not met, the If the geo fence condition has not been met, it may be determined by the ME 104 if the duration of the estimate location function has expired at operation 320. If the duration of the estimate location function has not expired, the operation at 310 may be performed. If the duration of the estimate location function has expired, the PE 106 may be woken up at operation 322. A command may be issued to the PE 106 to produce a new estimate location function. At operation 324, the PE 106 may determine using the location function, whether the geo fence condition has been met. If the geo fence condition has been met the operation 308 may be performed. If the geo fence condition has not been met the operation 310 may be performed.

One or more of the systems, apparatuses, and methods discussed have included the PE 106 producing an estimate location function that approximates the location function implemented by the PE 106. Alternatively, instead of producing an estimate location function, the geographical boundaries 116 may be translated to pseudo ranges, such that if a pseudo range determined by the ME 104 matches a pseudo range from the translated geographical boundary, a device is determined to be within that geo fence boundary.

Figure 4:
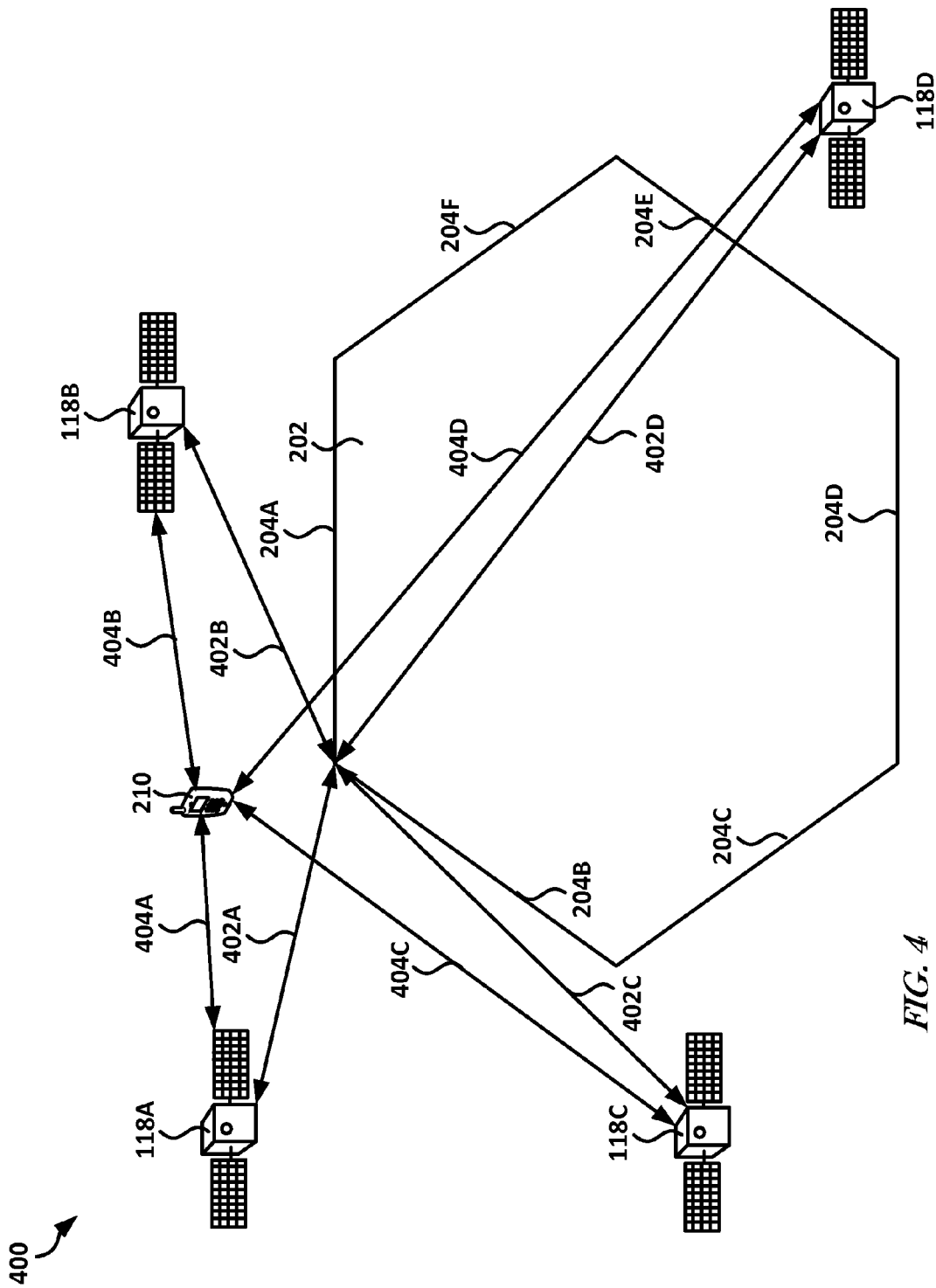
FIG. 4 illustrates, by way of example, a block diagram of an embodiment of a translated geo fence.

FIG. 4 illustrates, by way of example, a conceptual block diagram of an embodiment of a geo fence system 400. The geo fence system 400 may include the geo fence 202, the device 210, and the satellites 118A-D. The pseudo ranges 402A, 402B, 402C, and 402D indicate distances between a vertex of the geo fence 202 and the respective satellites 118A, 118B, 118C, and 118D. The pseudo ranges 402A-D may be determined by the PE 106. The pseudo ranges 402A-D may be determined for each vertex of the geo fence 202, such as the vertex connecting each geo fence boundary 204A-F. The pseudo ranges 402A-D may be determined using a reciprocal of the location function implemented by the PE 106 as discussed below. The pseudo ranges 402A-D for the geo fence 202, as determined by the PE 106, may be provided to the ME 104. The ME 104 may determine pseudo ranges 404A, 404B, 404C, and 404D that indicate distances between the device 210 and the satellites 118A-D for the device's current position. The ME 104 may compare those pseudo ranges 402A-D to the pseudo ranges 404A-D to determine if the device has crossed the geo fence boundary 204A-F

The PE 106 may assume the device 210 is positioned at the vertex and determine, for a specified period of time, what the pseudo ranges 402A-D would be using the assumed position of the device 210 at the assumed time. Because the satellites 118A-D are in motion and the device 210 may be moving, the pseudo ranges 402A-D and 404A-D change Thus, the pseudo ranges 402A-D predicted by the PE 106 may be valid to within a bounded error for only a specified amount of time.

Translating the geo fence boundary 204A-F and/or the vertex of the boundary to a pseudo range 402A-D may include generating a reciprocal function that may be used to translate the geo fence boundaries 116 (e.g., the boundary 204A-F or the vertex) to ranges of pseudo ranges on the active satellites. Such a translation eliminates the need to run a simplified PE model (i.e. approximate the location function implemented by the PE 106). As previously discussed, a typical PE 106 uses a parametric function that accepts time, orbit information, and an environmental state as parameters, and converts pseudo ranges into a position estimate as follows: P=F[Time, OrbitInfo, Environmental State](Pseudo Ranges).

Within a reasonable estimate, the reciprocal function of F may be defined as 1/P or 1/{ F[Time, OrbitInfo, Environmental State](Pseudo Ranges)}. The reciprocal function can be used to generate the pseudo ranges 402A-D. The PE 106 may use the speed, trajectory, and/or direction of the device 210 in determining the pseudo ranges 402A-D. For a given time duration $\Delta T$ the error and the pseudo ranges 402A-D may be calculated: [pseudo ranges, E]=(Position)/F[Time, OrbitInfo, Environmental State] from time t=t−delta T to t=T. Substituting the values of the geo fence boundaries 216 into the "Position" variable, a range of pseudo ranges and errors for each of satellites participating in the measurement may be determined Transferring the pseudo range, E, and/or time range (i.e. [t−delta T, T]) to the ME 104, the location of the device 210 may be evaluated in terms of predicted pseudo ranges of the geographical boundaries 116.

Figure 5:
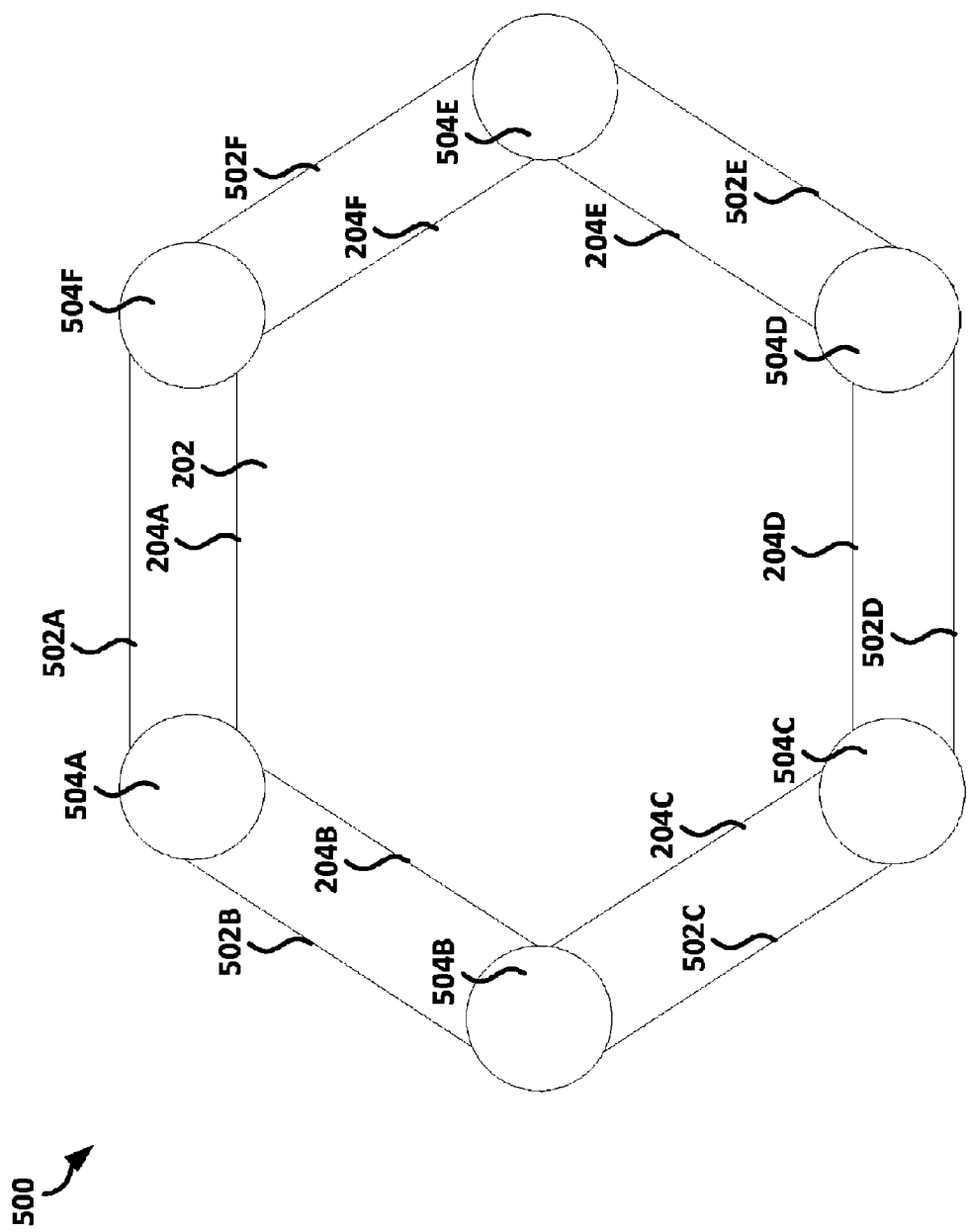
FIG. 5 illustrates, by way of example, a conceptual block diagram of an embodiment of a geo fence system.

FIG. 5 illustrates, by way of example, an embodiment of a geo fence 500 that has been translated using the predicted pseudo ranges 402A-D. The geo fence 500 may include an original geo fence 202 defined by geo fence boundaries 204A-F. Since the pseudo ranges from the satellite 118A-D include error, translating the geo fence boundaries 116 (e.g., translating vertices of the geo fence) to a range of pseudo ranges may introduce error into the original boundaries 204A-F of the geo fence 202. The circles 504A, 504B, 504C, 504D, 504E, and 504F indicate ranges of values that are returned from applying the pseudo range translation to the vertices of the geo fence 202. The boundaries 502A, 502B, 502C, 502D, 502E, and 502F indicate possible new boundaries for the geo fence 202 after accounting for the pseudo range translation error.

Figure 6:
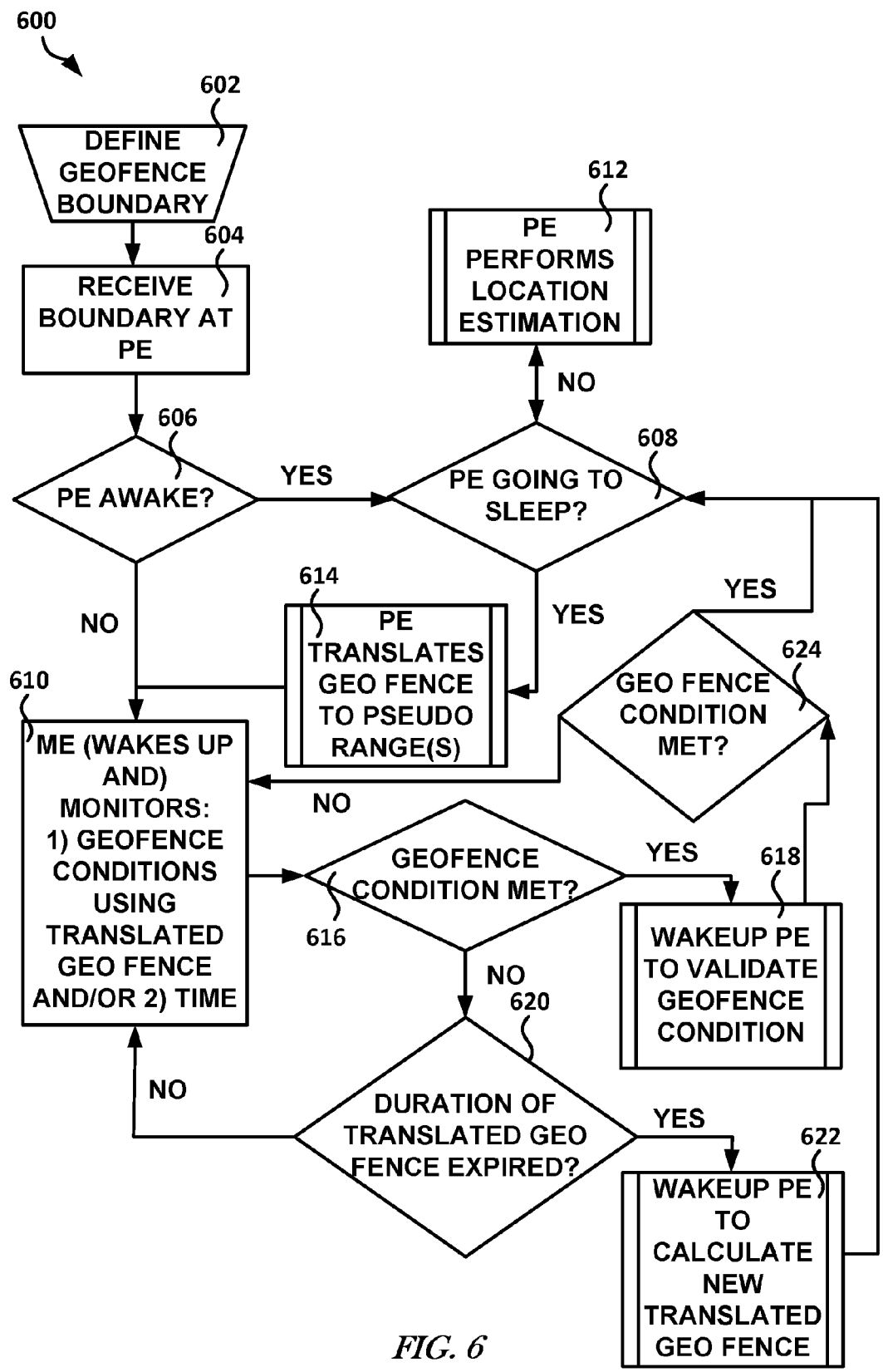
FIG. 6 illustrates, by way of example, a flow diagram of an embodiment of a method of geo fencing.

FIG. 6 illustrates, by way of example, a flow diagram of an embodiment of a method 600 of geo fencing. The method 600 may include defining or receiving a geo fence boundary at operation 602. The geo fence boundary may be received at the PE 106 and/or the ME 104 at operation 604. At operation 606, it may be determined if the PE 106 is awake (i.e. in an active mode of operation or not in a sleep mode). If the PE 106 is awake, it may be determined at operation 608 if the PE 106 is going to sleep. If the PE 106 is not awake, the ME 104 may be woken up periodically to monitor a geo fence condition (e.g., if a geo fence boundary has been crossed) using a translated geo fence, at operation 610. The ME 104 may monitor a time to determine whether the translated geo fence is still valid, at operation 610.

At operation 608, it may be determined whether the PE 106 is going to sleep. If the PE 106 is not going to sleep, the PE 106 may perform a location estimation at operation 612. If the PE 106 is going to sleep, the PE 106 may generate a translated geo fence, at operation 614. The generated pseudo ranges of the geo fence boundary produced from the translation may be sent to the ME 104 at operation 614. At operation 616, the ME 104 may determine if a geo fence condition is met. If the geo fence condition is met, the PE 106 may be woken up at operation 618. In the example of the technique 600, the geo fence condition being met includes the ME 104 determining that a device has crossed a geo fence boundary 204A-F. This determination may be accomplished by comparing pseudo ranges of the satellites, as determined by the ME 104, to the pseudo ranges as determined by the PE 106. If the comparison of the pseudo ranges indicates that the device 210 is in a location defined by the translated geo fence, then the ME 104 may determine the device has crossed the geo fence boundary 204A-F.

A command may be issued to the PE 106 to validate that the geo fence condition was/is met, such as at operation 618. The PE 106 may determine whether the geo fence condition was/is met, and report to the ME 104 or the location client 108 whether the condition was or was not met. If the geo fence condition was not met, it may be determined by the ME 104 if the duration of the translated geo fence boundary has expired, at operation 620. If the duration of the translated geo fence boundary has not expired, the operation at 610 may be performed. If the duration of the translated geo fence boundary has expired, the PE 106 may be woken up at operation 622. A command may be issued to the PE 106 to produce a new translated geo fence boundary. At operation 624, the PE 106 may determine using the location function, whether the geo fence condition has been met. If the geo fence condition has been met the operation 608 may be performed. If the geo fence condition has not been met the operation 610 may be performed.

Figure 7:
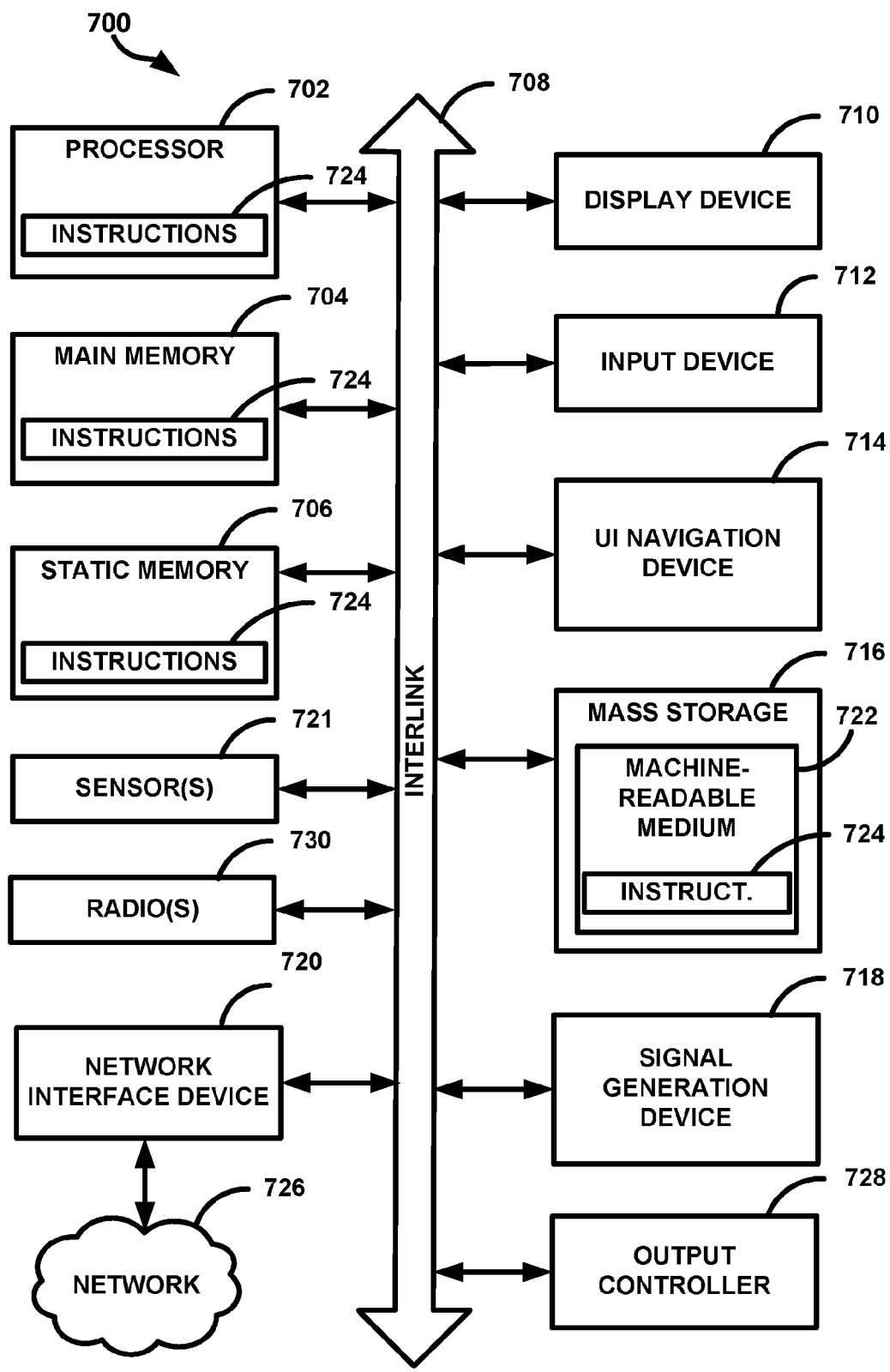
FIG. 7 illustrates, by way of example, a block diagram of an embodiment of a device upon which any of one or more techniques (e.g., methods) discussed herein may be performed.

FIG. 7 illustrates, by way of example, a block diagram of an embodiment of a computing device 700. The device 700 (e.g., a machine) may operate so as to perform one or more of the programming or communication techniques (e.g., methodologies) discussed herein. In some examples, the device 700 may operate as a standalone device or may be connected (e.g., networked) to one or more items, such as the ME 104, the PE 106, the location client 108, and/or the device 210. In other examples, the one or more items of the device 700 may be a part of the ME 104, PE 106, the location client 108, and/or the device 210 as discussed herein.

Embodiments, as described herein, may include, or may operate on, logic or a number of components, modules (e.g., engines), or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively may be coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Device (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The device 700 may further include a display unit 710, an input device 712 (e.g., an alphanumeric keyboard), and a user interface (UI) navigation device 714 (e.g., a mouse). In an example, the display unit 710, input device 712 and UI navigation device 714 may be a touch screen display. The device 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The device 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 700 may include one or more radios 730 (e.g., transmission, reception, or transceiver devices). The radios 730 may include one or more antennas to receive signal transmissions. The radios 730 may be coupled to or include the processor 702. The processor 702 may cause the radios 730 to perform one or more transmit or receive operations. Coupling the radios 730 to such a processor may be considered configuring the radio 730 to perform such operations. In general, an item being "caused" to perform an operation includes the item receiving data, interpreting the data as a command to perform an operation, and performing the operation. The signal does not have to be issued by the item that is causing the other item to perform the operation. Generally, "a first item causing a second item to perform an operation" means that the first item provided data that is already properly formatted to communicate with the second item or needs formatting and eventually becomes data that the second item receives and interprets as a command to perform the operation.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the device 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724. The term "machine readable medium" may include any tangible medium that is capable of storing, encoding, or carrying instructions for execution by the device 700 and that cause the device 700 to perform any one or more of the techniques of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 700, and includes digital or analog communications signals or other intangible medium to facilitate communication of such software.

EXAMPLES AND NOTES

The present subject matter may be described by way of several examples.

Example 1 may include or use subject matter (such as an apparatus, a method, a means for performing acts, or a device readable memory including instructions that, when performed by the device, may cause the device to perform acts), such as may include or use processing circuitry including a Measurement Engine (ME) and a Position Engine (PE), the PE to provide a location estimate of the device using a location function, generate an estimate location function that approximates the location function to within a specified error, and provide the estimate location function to the ME, and the ME to receive a geo fence boundary defining a boundary of a geographical region, determine a plurality of pseudo ranges between the device and a plurality of navigation satellites, and determine, using the estimate location function and the plurality of pseudo ranges, whether the device is within the geographical region defined by the geo fence boundary.

Example 2 may include or use, or may optionally be combined with the subject matter of Example 1, to include or use, wherein the ME is further to, in response to determining the device is within the geographical region defined by the geo fence boundary, wake up the PE and command the PE to determine, using the location function, whether the device is within the geo fence boundary.

Example 3 may include or use, or may optionally be combined with the subject matter of at least one of Examples 1-2, to include or use, wherein the PE generates the estimate location function using orbital information of the plurality of satellites, an environmental state including a multipath or shading, and a time.

Example 4 may include or use, or may optionally be combined with the subject matter of at least one of Examples 1-3, to include or use, wherein the PE generates the estimate location function using a polynomial estimate or a range matrix estimate technique.

Example 5 may include or use, or may optionally be combined with the subject matter of at least one of Examples 1-4, to include or use, wherein the ME is in the Physical (PHY) layer of the device and the PE is in a higher layer of the device.

Example 6 may include or use, or may optionally be combined with the subject matter of Example 2, to include or use, wherein the PE is further to, in response to the PE determining the device is within the geo fence boundary, generate an updated estimate location function that approximates the location function implemented by the PE and provide the updated estimate location function to the ME.

Example 7 may include or use, or may optionally be combined with the subject matter of at least one of Examples 1-6, to include or use, wherein the processing circuitry is further to produce an alert including a communication indicating that the device has crossed the geo fence boundary in response to the PE determining the device is within the geo fence boundary.

Example 8 may include or use, or may optionally be combined with the subject matter of at least one of Examples 1-7, to include or use, wherein the ME is further to wake up the PE and command the PE to update the estimate location function in response to a specified period of time lapsing.

Example 9 may include or use, or may optionally be combined with the subject matter of at least one of Examples 1-8, to include or use, wherein the ME is to wake up periodically to determine whether the device is within the geographical region defined by the geo fence boundary.

Example 10 may include or use, or may optionally be combined with the subject matter of at least one of Examples 1-9, to include or use, wherein the specified error of the estimate location function is greater than a location estimate error associated with the location function.

Example 11 may include or use, or may optionally be combined with the subject matter of at least one of Examples 1-10, to include or use one or more radios electrically coupled to the processing circuitry and one or more memories electrically coupled to the processing circuitry.

Example 12 may include or use, or may optionally be combined with the subject matter of Example 11, to include or use one or more antennas electrically coupled to the one or more radios.

Example 13 may include or use subject matter (such as an apparatus, a method, a means for performing acts, or a device readable memory including instructions that, when performed by the device, may cause the device to perform acts), such as may include or use providing, using a Position Engine (PE), a location estimate of a device using a location function, generating, using the PE, an estimate location function that approximates the location function to within a specified error, determining, using a Measurement Engine (ME), a plurality of pseudo ranges between the device and a plurality of navigation satellites, and determining, using the ME, the estimate location function, and the plurality of pseudo ranges, whether the device is within a geographical region defined by a geo fence boundary.

Example 14 may include or use, or may optionally be combined with the subject matter of Example 13, to include or use in response to determining the device is within the geographical region defined by the geo fence boundary, waking up the PE and commanding the PE to determine, using the location function, whether the device is within the geo fence boundary.

Example 15 may include or use, or may optionally be combined with the subject matter of Example 14, to include or use generating, using the PE and in response to the PE determining the device is within the geo fence boundary, an updated estimate location function that approximates the location function implemented by the PE and provide the updated estimate location function to the ME.

Example 16 may include or use, or may optionally be combined with the subject matter of at least one of Examples 13-15, to include or use, wherein generating the estimate location function includes generating the estimate location function using orbital information of the plurality of satellites, an environmental state including a multipath or shading, and a time and generating the estimate location function using a polynomial estimate or a range matrix estimate technique.

Example 17 may include or use, or may optionally be combined with the subject matter of at least one of Examples 13-16, to include or use producing an alert including a communication indicating that the device has crossed the geo fence boundary in response to the PE determining the device is within the geo fence boundary.

Example 18 may include or use, or may optionally be combined with the subject matter of at least one of Examples 13-17, to include or use waking up the PE and commanding the PE to update the estimate location function in response to a specified period of time lapsing.

Example 19 may include or use, or may optionally be combined with the subject matter of at least one of Examples 13-18, to include or use waking up the ME periodically to determine whether the device is within the geographical region defined by the geo fence boundary.

Example 20 may include or use, or may optionally be combined with the subject matter of at least one of Examples 13-19, to include or use, wherein the specified error of the estimate location function is greater than a location estimate error associated with the location function.

Example 21 may include or use subject matter (such as an apparatus, a method, a means for performing acts, or a device readable memory including instructions that, when performed by the device, may cause the device to perform acts), such as may include or use a non-transitory computer-readable storage medium that stores instructions for execution by one or more processors of a wireless communication device to configure the device to perform operations to provide a location estimate of the device using a location function, generate an estimate location function that approximates the location function to within a specified error, determine a plurality of pseudo ranges between the device and a plurality of navigation satellites, and determine, using the estimate location function and the plurality of pseudo ranges, whether the device is within a geographical region defined by a geo fence boundary.

Example 22 may include or use, or may optionally be combined with the subject matter of Example 21, to include or use instructions for execution by the one or more processors to configure the device to perform operations comprising, in response to determining the device is within the geographical region defined by the geo fence boundary, waking up a Position Engine (PE) and commanding the PE to determine, using the location function, whether the device is within the geo fence boundary.

Example 23 may include or use, or may optionally be combined with the subject matter of Example 22, to include or use instructions for execution by the one or more processors to configure the device to perform operations to generate, in response to the PE determining the device is within the geo fence boundary, an updated estimate location function that approximates the location function.

Example 24 may include or use, or may optionally be combined with the subject matter of at least one of Examples 21-23, to include or use, wherein the instructions for generating the estimate location function include instructions for execution by the one or more processors to configure the device to perform operations to generate the estimate location function using orbital information of the plurality of satellites, an environmental state including a multipath or shading, and a time and generating the estimate location function using a polynomial estimate or a range matrix estimate technique.

Example 25 may include or use, or may optionally be combined with the subject matter of at least one of Examples 21-24, to include or use instructions for execution by one or more processors of a wireless communication device to configure the device to perform operations to in response to the PE determining the device is within the geo fence boundary, generate an updated estimate location function that approximates the location function implemented by the PE and provide the updated estimate location function to the ME.

Example 26 may include or use, or may optionally be combined with the subject matter of Example 22, to include or use instructions for execution by one or more processors of a wireless communication device to configure the device to perform operations comprising producing an alert including a communication indicating that the device has crossed the geo fence boundary in response to the PE determining the device is within the geo fence boundary.

Example 27 may include or use, or may optionally be combined with the subject matter of at least one of Examples 21-26, to include or use instructions for execution by one or more processors of a wireless communication device to configure the device to perform operations comprising waking up the PE and commanding the PE to update the estimate location function in response to a specified period of time lapsing.

Example 28 may include or use, or may optionally be combined with the subject matter of at least one of Examples 21-27, to include or use instructions for execution by one or more processors of a wireless communication device to configure the device to perform operations comprising waking up the ME periodically to determine whether the device is within the geographical region defined by the geo fence boundary.

Example 29 may include or use, or may optionally be combined with the subject matter of at least one of Examples 21-28, to include or use, wherein the specified error of the estimate location function is greater than a location estimate error associated with the location function.

Example 30 may include or use, or may optionally be combined with the subject matter of at least one of Examples 13-20, to include or use a machine-readable medium including instructions, which when executed by a machine, cause the machine to perform operations of any of the methods of Examples 13-20.

Example 31 may include or use, or may optionally be combined with the subject matter of at least one of Examples 13-20, to include or use an apparatus comprising means for performing any of the methods of Examples 13-20.

Example 32 may include or use subject matter (such as an apparatus, a method, a means for performing acts, or a device readable memory including instructions that, when performed by the device, may cause the device to perform acts), such as may include or use processing circuitry including a Measurement Engine (ME) and a Position Engine (PE), the PE to generate a translate a geo fence boundary to a plurality of pseudo range, the geo fence boundary defining a boundary defining a boundary of a geographical region, the pseudo ranges identifying distances between a device and respective satellites and corresponding to the device being at the geo fence boundary, and the ME to determine pseudo ranges of distances between a current location of the device and the satellites and compare the pseudo ranges from translating the geo fence boundary to the pseudo ranges determined by the ME to determine whether the device is within the geo fence boundary.

Example 33 may include or use, or may optionally be combined with the subject matter of Example 32, to include or use, wherein the ME is further to, in response to determining the device is within the geographical region defined by the geo fence boundary, wake up the PE and command the PE to determine whether the device is within the geo fence boundary.

Example 34 may include or use, or may optionally be combined with the subject matter of at least one of Examples 32-33, to include or use, wherein the PE generates the pseudo ranges using an estimate of a reciprocal of a location function implemented by the PE.

Example 35 may include or use, or may optionally be combined with the subject matter of at least one of Examples 32-34, to include or use, wherein the ME is in the Physical (PHY) layer of the device and the PE is in a higher layer of the device.

Example 36 may include or use, or may optionally be combined with the subject matter of at least one of Examples 32-35, to include or use, wherein the PE is further to, in response to the PE determining the device is within the geo fence boundary, generate updated pseudo ranges corresponding to the translated geo fence boundary and provide the updated pseudo ranges to the ME.

Example 37 may include or use, or may optionally be combined with the subject matter of Example 36, to include or use, wherein the processing circuitry is further to produce an alert including a communication indicating that the device has crossed the geo fence boundary in response to the PE determining the device is within the geo fence boundary.

Example 38 may include or use, or may optionally be combined with the subject matter of at least one of Examples 32-37, to include or use, wherein the ME is further to wake up the PE and command the PE to update the pseudo ranges corresponding to the translated geo fence boundary in response to a specified period of time lapsing.

Example 39 may include or use, or may optionally be combined with the subject matter of at least one of Examples 32-38, to include or use, wherein the ME is to wake up periodically to determine whether the device is within the geographical region defined by the geo fence boundary.

Example 40 may include or use, or may optionally be combined with the subject matter of at least one of Examples 32-39, to include or use one or more radios electrically coupled to the processing circuitry, and one or more memories electrically coupled to the processing circuitry.

Example 41 may include or use, or may optionally be combined with the subject matter of Example 40, to include or use one or more antennas electrically coupled to the one or more radios.

Example 42 may include or use subject matter (such as an apparatus, a method, a means for performing acts, or a device readable memory including instructions that, when performed by the device, may cause the device to perform acts), such as may include or use a method of performing operations executed by one or more computer processors, the method comprising receiving pseudo ranges corresponding to a translated geo fence boundary, the geo fence boundary defining a boundary of a geographical region, the translated geo fence boundary including pseudo ranges identifying distances between a device and respective satellites and corresponding to the device being at the geo fence boundary, determining pseudo ranges of distances between the device and the satellites, and comparing the received pseudo ranges to the determined pseudo ranges to determine whether the device is within the geo fence boundary.

Example 43 may include or use, or may optionally be combined with the subject matter of Example 42, to include or use generating the pseudo ranges corresponding to the translated geo fence boundary using orbit information of a satellite, an environmental state including a multipath or shading, and a time lapse since the pseudo range corresponding to the translated geo fence boundary was calculated.

Example 44 may include or use, or may optionally be combined with the subject matter of Example 43, to include or use, wherein generating the pseudo ranges corresponding to the translated geo fence boundary includes using an estimate of the reciprocal of a location function implemented by a position engine (PE) of a device in generating the translated geo fence boundary.

Example 45 may include or use, or may optionally be combined with the subject matter of at least one of Examples 42-44, to include or use, in response to determining the device is within the geographical region defined by the geo fence boundary, waking up the PE and commanding the PE to determine, using the location function implemented by the PE, whether the device is within the geo fence boundary.

Example 46 may include or use, or may optionally be combined with the subject matter of Example 45, to include or use, in response to the PE determining the device is within the geo fence boundary, receive an updated geo fence boundary translation that indicates pseudo ranges corresponding to distances between the device and the satellites if the device was at the geo fence boundary.

Example 47 may include or use, or may optionally be combined with the subject matter of at least one of Examples 42-46, to include or use waking up the PE and commanding the PE to update the pseudo ranges corresponding to the translated geo fence boundary in response to a specified period of time lapsing since the pseudo ranges corresponding to a translated geo fence boundary were received.

Example 48 may include or use, or may optionally be combined with the subject matter of at least one of Examples 42-47, to include or use, wherein comparing the received pseudo ranges to the determined pseudo ranges to determine whether the device is within the geo fence boundary includes waking up periodically to compare the received pseudo ranges to the determined pseudo ranges to determine whether the device is within the geo fence boundary.

Example 49 may include or use subject matter (such as an apparatus, a method, a means for performing acts, or a device readable memory including instructions that, when performed by the device, may cause the device to perform acts), such as may include or use a non-transitory computer-readable storage medium that stores instructions for execution by one or more processors of a wireless communication device to configure the device to perform operations to receive pseudo ranges corresponding to a translated geo fence boundary, the geo fence boundary defining a boundary of a geographical region, the translated geo fence boundary including pseudo ranges identifying distances between a device and respective satellites and corresponding to the device being at the geo fence boundary, determine pseudo ranges of distances between the device and the satellites, and compare the received pseudo ranges to the determined pseudo ranges to determine whether the device is within the geo fence boundary.

Example 50 may include or use, or may optionally be combined with the subject matter of Example 49, to include or use instructions for execution by one or more processors of a wireless communication device to configure the device to perform operations to generate the pseudo ranges corresponding to the translated geo fence boundary using orbit information of a satellite, an environmental state including a multipath or shading, and a time lapse since the pseudo ranges corresponding to the translated geo fence boundary were generated.

Example 51 may include or use, or may optionally be combined with the subject matter of Example 50, to include or use, wherein the instructions for generating the pseudo ranges corresponding to the translated geo fence boundary include instructions for execution by one or more processors of a wireless communication device to configure the device to perform operations to use an estimate of the reciprocal of a location function implemented by a position engine (PE) of a device in generating the translated geo fence boundary.

Example 52 may include or use, or may optionally be combined with the subject matter of at least one of Examples 49-51, to include or use instructions for execution by one or more processors of a wireless communication device to configure the device to perform operations to, in response to determining the device is within the geographical region defined by the geo fence boundary, wake up the PE and command the PE to determine, using the location function implemented by the PE, whether the device is within the geo fence boundary.

Example 53 may include or use, or may optionally be combined with the subject matter of Example 52, to include or use instructions for execution by one or more processors of a wireless communication device to configure the device to perform operations to in response to the PE determining the device is within the geo fence boundary, receive an updated geo fence boundary translation that indicates pseudo ranges corresponding to distances between the device and the satellites if the device was at the geo fence boundary.

Example 54 may include or use, or may optionally be combined with the subject matter of at least one of Examples 49-53, to include or use instructions for execution by one or more processors of a wireless communication device to configure the device to perform operations to wake up the PE and commanding the PE to update the pseudo ranges corresponding to the translated geo fence boundary in response to a specified period of time lapsing since the pseudo ranges corresponding to a translated geo fence boundary were received.

Example 55 may include or use, or may optionally be combined with the subject matter of at least one of Examples 49-54, to include or use, wherein the instructions for comparing the received pseudo ranges to the determined pseudo ranges to determine whether the device is within the geo fence boundary include instructions for execution by one or more processors of a wireless communication device to configure the device to perform operations to wake up periodically to compare the received pseudo ranges to the determined pseudo ranges to determine whether the device is within the geo fence boundary.

Example 56 may include or use, or may optionally be combined with the subject matter of at least one of Examples 42-48, to include or use a machine-readable medium including instructions, which when executed by a machine, cause the machine to perform operations of any of the methods of Examples 42-48.

Example 57 may include or use, or may optionally be combined with the subject matter of at least one of Examples 42-48, to include or use an apparatus comprising means for performing any of the methods of Examples 42-48.

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac)* ("*IEEE802.11-09/0308r12-TGac Channel Model Addendum Document*"); *IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012*)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some embodiments may be used in conjunction with a WLAN. Other embodiments may be used in conjunction with any other suitable wireless communication network, for example, a wireless area network, a "piconet", a WPAN, a WVAN and the like.

Some embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mm-Wave) frequency band), e.g., a frequency band within the frequency band of between 20 Ghz and 300 GHZ, a WLAN frequency band, a WPAN frequency band, a frequency band according to the WGA specification, and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A mobile device comprising:
   processing circuitry including a Measurement Engine (ME) and a Position Engine (PE), the PE to:
   provide a location estimate of the device using a location function, the location estimate estimating the location of the device to within a first error,
   determine the PE is going into a sleep mode,
   in response to a determination that the PE is going into the sleep mode, generate an estimate location function that approximates the location function to within a specified error and generate a corresponding expiration time that indicates a time at which the estimate location function is no longer valid, the location of the device as determined by the estimate location function including a second error, the first error less than the second error, and
   provide the estimate location function to the ME, and the ME to:
   receive a geo fence boundary defining a boundary of a geographical region,
   determine a plurality of pseudo ranges between the device and a plurality of navigation satellites,
   determine, while the PE is in the sleep mode and using the estimate location function and the plurality of pseudo ranges, whether the device is within the geographical region defined by the geo fence boundary and whether the specified time has elapsed, and
   in response to determining at least one of (1) the device is not within the geographical region defined by the geo fence boundary and (2) the expiration time has elapsed, provide a signal that causes the PE to wake up and provide an updated estimate location function to the ME.

2. The device of claim 1, wherein the ME is further to, in response to determining the device is within the geographical region defined by the geo fence boundary, wake up the PE and command the PE to determine, using the location function, whether the device is within the geo fence boundary.

3. The device of claim 1, wherein the PE generates the estimate location function using orbital information of the plurality of satellites, an environmental state including a multipath or shading, and a time.

4. The device of claim 1, wherein the processing circuitry is further to produce an alert including a communication indicating that the device has crossed the geo fence boundary in response to the PE determining the device is within the geo fence boundary.

5. The device of claim 1, wherein the ME is further to wake up the PE and command the PE to update the estimate location function in response to a specified period of time lapsing.

6. The device of claim 1, wherein the ME is to wake up periodically to determine whether the device is within the geographical region defined by the geo fence boundary.

7. The device of claim 1, further comprising:
   one or more radios electrically coupled to the processing circuitry; and
   one or more memories electrically coupled to the processing circuitry.

8. The device of claim 7, further comprising one or more antennas electrically coupled to the one or more radios.

9. The device of claim 1, wherein the PE generates the estimate location function using a polynomial estimate or a range matrix estimate technique.

10. The device of claim 9, wherein the ME is in the Physical (PHY) layer of the device and the PE is in a higher layer of the device.

11. A method of performing operations performed by processing circuitry of a wireless communication device, the method comprising:
    providing, using a Position Engine (PE), a location estimate of the device using a location function, the location estimate of the device estimating the location to within a first error;
    determining the PE is going into a sleep mode,
    in response to a determination that the PE is going into the sleep mode, generating, using the PE, an estimate location function that approximates the location function to within a specified error;
    generating a corresponding expiration time that indicates a time at which the estimate location function is no longer valid, the location of the device as determined by the estimate location function including a second error, the first error less than the second error;
    providing the estimate location function to a Measurement Engine (ME);
    determining, using the ME, a plurality of pseudo ranges between the device and a plurality of navigation satellites;
    determining while the PE is in the sleep mode, and using the ME, the estimate location function, and the plurality of pseudo ranges, whether the device is within a geographical region defined by the geo fence boundary and whether the specified time has elapsed; and
    in response to determining at least one of (1) the device is not within the geographical region defined by the geo fence boundary and (2) the expiration time has elapsed, provide a signal that causes the PE to wake up and provide an updated estimate location function to the ME.

12. The method of claim 11, further comprising in response to determining the device is within the geographical region defined by the geo fence boundary, waking up the PE and commanding the PE to determine, using the location function, whether the device is within the geo fence boundary.

13. The method of claim 12, further comprising, generating, using the PE and in response to the PE determining the device is within the geo fence boundary, an updated estimate location function that approximates the location function implemented by the PE and provide the updated estimate location function to the ME.

14. A non-transitory computer-readable storage medium that stores instructions for execution by one or more processors of a wireless communication device to configure the device to perform operations to:

provide a location estimate of the device using a location function, the location estimate of the device estimating the location to within a first error;

determine a Position Engine (PE) is going into a sleep mode;

in response to a determination that the PE is going into the sleep mode, generate an estimate location function that approximates the location function to within a specified error;

generate a corresponding expiration time that indicates a time at which the estimate location function is no longer valid, the location of the device as determined by the estimate location function including a second error, the first error less than the second error;

determine a plurality of pseudo ranges between the device and a plurality of navigation satellites;

determine, while the PE is in the sleep mode, and using the estimate location function and the plurality of pseudo ranges, whether the device is within a geographical region defined by a geo fence boundary and whether the specified time has elapsed; and in response to a determination that at least one of (1) the device is not within the geographical region defined by the geo fence boundary and (2) the expiration time has elapsed, provide a signal that causes the PE to wake up and provide an updated estimate location function to the ME.

15. The medium of claim 14, further comprising instructions for execution by the one or more processors to configure the device to perform operations to, in response to determining the device is within the geographical region defined by the geo fence boundary, wake up the PE and commanding the PE to determine, using the location function, whether the device is within the geo fence boundary.

16. The medium of claim 14, wherein the instructions for generating the estimate location function include instructions for execution by the one or more processors to configure the device to perform operations comprising generating the estimate location function using orbital information of the plurality of satellites, an environmental state including a multipath or shading, and a time and generating the estimate location function using a polynomial estimate or a range matrix estimate technique.

\* \* \* \* \*